(12) United States Patent
Lee (10) Patent No.: US 11,181,102 B2
(45) Date of Patent: Nov. 23, 2021

(54) PISTON PUMP FOR BRAKE SYSTEM

(71) Applicant: MANDO CORPORATION, Pyeongtaek-si (KR)

(72) Inventor: Chung Jae Lee, Gunpo-si (KR)

(73) Assignee: Mando Corporation, Pyeongtaek-si (KR)

( * ) Notice: Subject to any disclaimer, the term of this patent is extended or adjusted under 35 U.S.C. 154(b) by 544 days.

(21) Appl. No.: 16/058,357

(22) Filed: Aug. 8, 2018

(65) Prior Publication Data
US 2019/0048862 A1 Feb. 14, 2019

(30) Foreign Application Priority Data

Aug. 8, 2017 (KR) .......................... 10-2017-0100100

(51) Int. Cl.
*F04B 19/02* (2006.01)
*B60T 13/16* (2006.01)
(Continued)

(52) U.S. Cl.
CPC .......... *F04B 19/022* (2013.01); *B60T 8/4031* (2013.01); *B60T 13/16* (2013.01);
(Continued)

(58) Field of Classification Search
CPC .... F04B 1/0408; F04B 1/0413; F04B 1/0439; F04B 1/0448; F04B 1/0452; F04B 1/053; F04B 5/02; F04B 9/045; F04B 11/0008; F04B 11/0033; F04B 19/02; F04B 19/022; F04B 53/001; F04B 53/1002; F04B 53/12;
(Continued)

(56) References Cited

U.S. PATENT DOCUMENTS 466,094 A * 12/1891 Evered .................. F02M 59/26
 417/469
572,783 A * 12/1896 Williams ................ F04B 27/02
 417/524
(Continued)

FOREIGN PATENT DOCUMENTS

KR 10-2000-0068948 A 11/2000
KR 10-2007-0038535 A 4/2007

*Primary Examiner* — Dominick L Plakkoottam
*Assistant Examiner* — Charles W Nichols
(74) *Attorney, Agent, or Firm* — Morgan, Lewis & Bockius LLP (57) ABSTRACT

Disclosed is a piston pump for a brake system installed in a bore of a modulator block communicating with an inlet port and a discharge port, wherein the piston pump includes: a cylinder unit provided to reciprocate within the bore; a piston unit having one end fixed and the other end dividing the inside of the cylinder unit into a first chamber and a second chamber and configured to expand or reduce the internal spaces of the first chamber and the second chamber by reciprocating movement of the cylinder unit; a first inlet valve installed in the cylinder unit to open and close an one-way flow of fluid from the inlet port to the first chamber; a second inlet valve installed in the cylinder unit to open and close an one-way flow of fluid from the inlet port to the second chamber; and an outlet valve to open and close an one-way flow of fluid from the first chamber or the second chamber to the discharge port.

7 Claims, 8 Drawing Sheets

(51) Int. Cl.
*F04B 5/02* (2006.01)
*F04B 53/12* (2006.01)
*F04B 53/14* (2006.01)
*F04B 53/00* (2006.01)
*F04B 1/053* (2020.01)
*B60T 17/02* (2006.01)
*F04B 53/10* (2006.01)
*F04B 1/0452* (2020.01)
*F04B 9/04* (2006.01)
*B60T 8/40* (2006.01)

(52) U.S. Cl.
CPC ............ *B60T 13/168* (2013.01); *B60T 17/02* (2013.01); *F04B 1/0452* (2013.01); *F04B 1/053* (2013.01); *F04B 5/02* (2013.01); *F04B 9/045* (2013.01); *F04B 53/1002* (2013.01); *F04B 53/12* (2013.01); *F04B 53/143* (2013.01)

(58) Field of Classification Search
CPC .... F04B 53/121; F04B 53/125; F04B 53/126; F04B 53/143; B60T 8/4031; B60T 13/16; B60T 13/168; B60T 17/02
See application file for complete search history.

(56) References Cited

U.S. PATENT DOCUMENTS

| | | | | |
|---|---|---|---|---|
| 827,714 A | * | 8/1906 | Dible | F04B 33/005 |
| | | | | 417/526 |
| 975,781 A | * | 11/1910 | Morris | F04B 39/0016 |
| | | | | 417/512 |
| 6,113,365 A | * | 9/2000 | Siegel | F04B 1/0404 |
| | | | | 417/434 |

* cited by examiner

PISTON PUMP FOR BRAKE SYSTEM

CROSS-REFERENCE TO RELATED APPLICATION(S)

This application is based on and claims priority under 35 U.S.C. § 119 to Korean Patent Application No. 10-2017-0100100, filed on Aug. 8, 2017 in the Korean Intellectual Property Office, the disclosure of which is incorporated by reference herein in its entirety.

BACKGROUND

1. Technical Field

The present disclosure relates to a piston pump for a brake system, and more particularly, to a piston pump for a brake system capable of improving the efficiency of the pump.

2. Description of the Related Art

Generally, a brake system installed in a vehicle controls braking hydraulic pressure to perform functions such as ABS, ESC, and ECC so as to secure the stability of the vehicle.

The brake system is provided with a modulator block for interrupting braking hydraulic pressure in the middle of the hydraulic lines connected to the wheel cylinders on the wheels side from the master cylinder. The modulator block includes a plurality of solenoid valves, a low pressure accumulator and a high pressure accumulator for temporarily storing the oil that has escaped from the wheel cylinders, a piston pump for pumping the oil stored temporarily in the low pressure accumulator by the operation of a motor, and an electronic control unit (ECU) for controlling the operations of the solenoid valves and the motors.

The piston pump serves to regulate the hydraulic pressure supplied to the wheel cylinders, and is disclosed in Korean Patent Registration No. 10-0538512 and Korean Patent Laid-open No. 10-2011-0124602.

According to the above documents, the piston pump includes a piston for receiving a fluid through an inlet port by moving forward and backward by the eccentric spindle of a motor and pressurizing oil in a pressurizing chamber, a piston spring for pushing the piston toward the eccentric spindle of the motor and reciprocating the piston together with the eccentric spindle, an inlet valve for controlling the flow of oil introduced through the inlet port, and an outlet valve for controlling the flow of the oil delivered through the inlet valve to a discharge port. That is, the piston pump performs the function of forcibly pumping the oil in the low pressure accumulator or the master cylinder toward the high pressure accumulator and delivering the oil to the wheel cylinders or the master cylinder.

SUMMARY

It is an aspect of the present disclosure to provide a piston pump for a brake system that operates more efficiently and has reduced NVH.

Additional aspects of the present disclosure will be set forth in part in the description which follows and, in part, will be obvious from the description, or may be learned by practice of the disclosure.

In accordance with one aspect of the present disclosure, there may be provided a piston pump for a brake system installed in a bore of a modulator block communicating with an inlet port and a discharge port, the piston pump comprising: a cylinder unit provided to reciprocate within the bore; a piston unit having one end fixed and the other end dividing the inside of the cylinder unit into a first chamber and a second chamber and configured to expand or reduce the internal spaces of the first chamber and the second chamber by reciprocating movement of the cylinder unit; a first inlet valve installed in the cylinder unit to open and close an one-way flow of fluid from the inlet port to the first chamber; a second inlet valve installed in the cylinder unit to open and close an one-way flow of fluid from the inlet port to the second chamber; and an outlet valve to open and close an one-way flow of fluid from the first chamber or the second chamber to the discharge port.

The piston unit may include a piston provided with a flow passage hole communicating with a discharge chamber, and a piston seal moving together with the cylinder unit along the outer surface of the piston to selectively communicate the flow passage hole with one of the first chamber and the second chamber.

The piston unit may further include a piston guide guiding the movement of the cylinder unit along the outer surface of the piston and having a second discharge passage, and a stopper for preventing the separation of the piston guide.

A first inflow passage may be formed on an surface of the cylinder unit facing the inlet port, the first inlet valve provided with a power transmitting member receiving a forward or backward force by an eccentric spindle may be coupled to an opening of one end of the cylinder unit, and the second inlet valve may be coupled to an opening of the other end of the cylinder unit.

The first inlet valve may include a power transmitting member receiving a forward force or a backward force by an eccentric spindle, and having a first inlet passage and a seat surface on which a first opening and closing member is seated, and a first elastic member supported at one end to a retainer fastened to the power transmitting member to provide an elastic force to the first opening and closing member.

The second inlet valve may include a second elastic member supported at one end to the cylinder unit, a second opening and closing member pressed by the other end of the second elastic member, a second guide member guiding the piston unit and provided with a second inlet passage opened and closed by the second opening and closing member, and a second stopper member provided with a second inflow passage and preventing the second guide member from being separated.

The outlet valve may include an outlet valve seat to which the piston unit is fixedly installed, an outlet cap coupled to the outlet valve seat to form a discharge chamber communicating with the discharge port, an outlet opening and closing member to press a flow passage of the outlet valve seat communicating with a flow passage hole of the piston unit, and an outlet elastic member supported to the outlet cap and providing an elastic force to the outlet opening and closing member.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be implemented in other forms. For the sake of clarity of the present invention, the drawings are not drawn to scale, and the size of the components may be slightly exaggerated to facilitate understanding.

Figure 1:
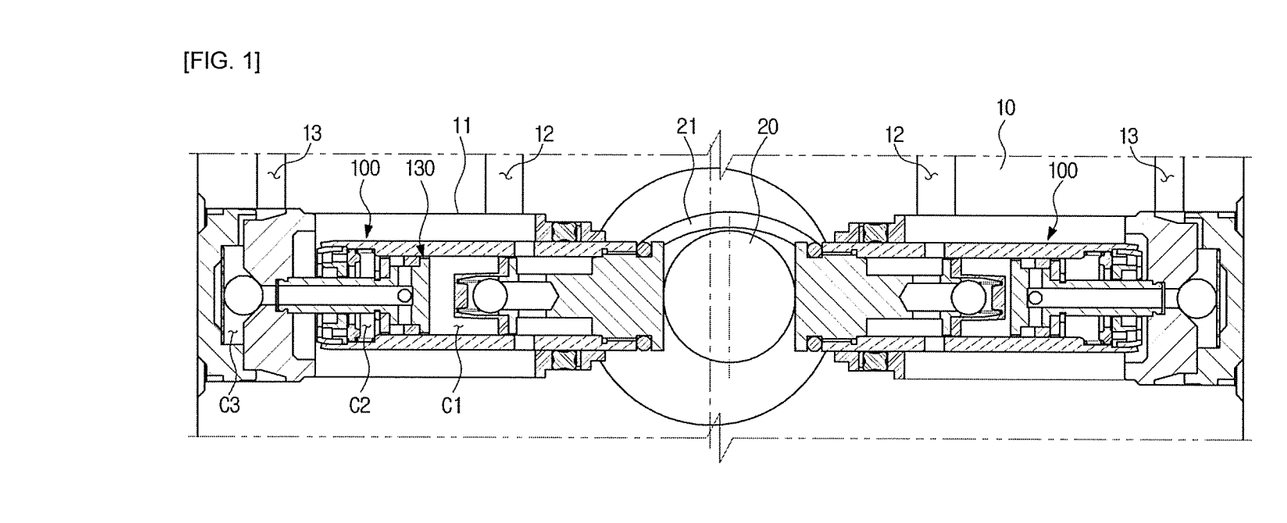
FIG. 1 is a cross-sectional view illustrating a reciprocating discharge type double piston pump for a brake system according to an embodiment of the present disclosure.

FIG. 1 is a cross-sectional view illustrating a reciprocating discharge type double piston pump for a brake system according to an embodiment of the present disclosure. Hereinafter, the structure of a brake system to which a piston pump 100 is applied will be briefly described with reference to FIG. 1.

The piston pump 100 may be a piston pump for electronic stability control (ESC). The ESC system, which is a system necessary for ensuring the safety of a vehicle during driving, sucks and discharges a working fluid while reciprocating the piston pump 100 through the rotation of a motor (not shown), thereby increasing the pressure in a wheel cylinder (not shown). That is, the ESC system rotates an eccentric spindle 20 press-fitted into a shaft of the motor (not shown), and the rotated eccentric spindle 20 reciprocates a cylinder unit 120 of the piston pump 100 to suck and discharge the working fluid, thereby increasing the pressure in the wheel cylinder.

As the piston pump 100, a reciprocating-discharge and two-piston type pump capable of rapidly increasing the pressure in a wheel cylinder while reducing the pressure pulsation generated during the operation of the pump may be used. A ring spring 21 is assembled to the eccentric spindle 20 and the piston pump 100, and when the motor rotates, the cylinder unit 120 is pressed by the eccentric spindle 20 or pulled by the ring spring 21, thereby reciprocating. That is, the piston pump 100 has a reciprocating-discharge and two-piston type pump structure for increasing the pressure in the wheel cylinder (not shown) while sucking and discharging the working fluid twice during one reciprocating motion. This structure makes it possible to improve the responsiveness and NVH performance of the piston pump 100.

Figure 2:
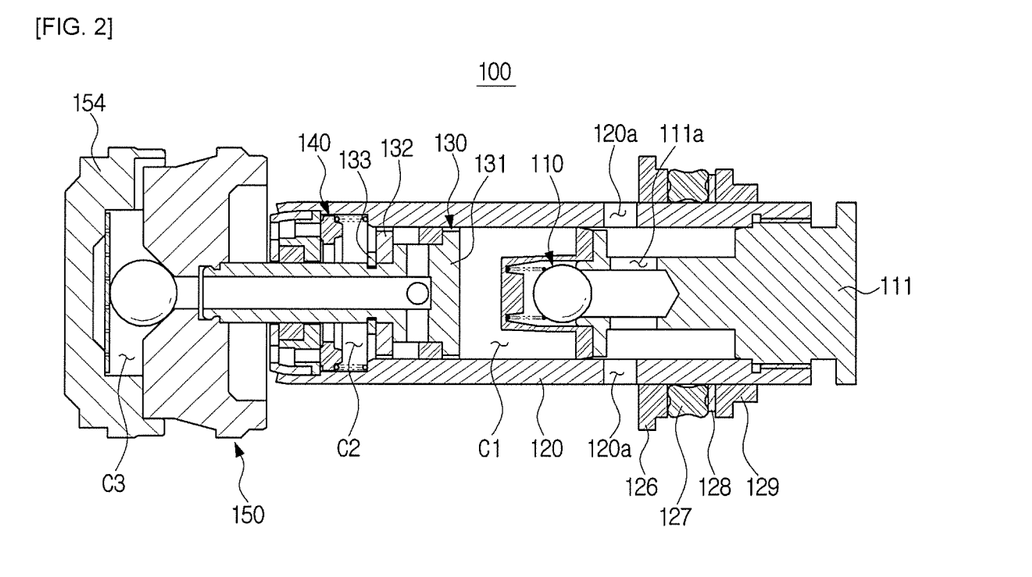
FIG. 2 is a cross-sectional view showing a piston pump for a brake system according to an embodiment of the present disclosure.
Figure 3:
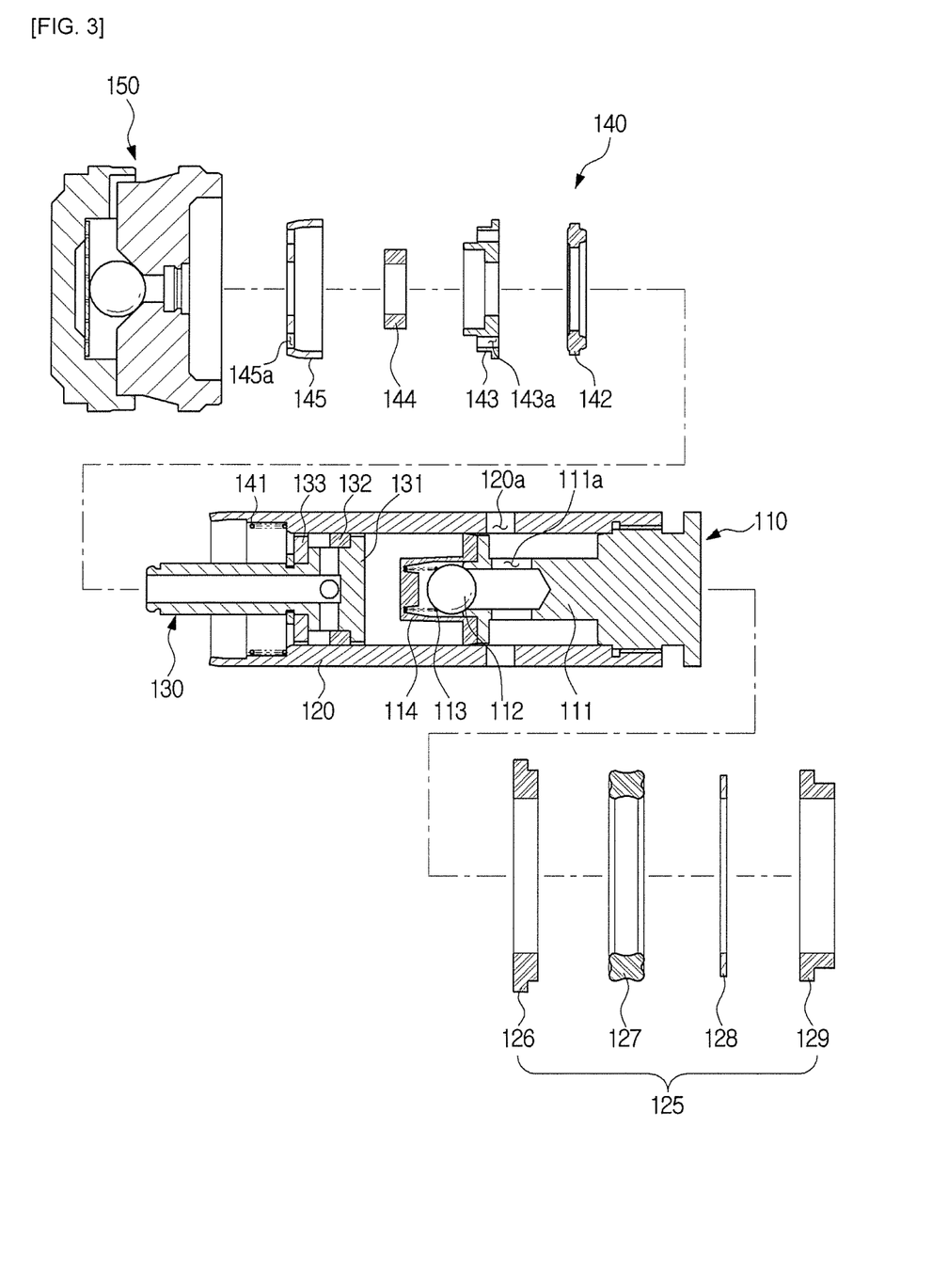
FIG. 3 is an exploded cross-sectional view of a piston pump for a brake system according to an embodiment of the present disclosure.
Figure 4:
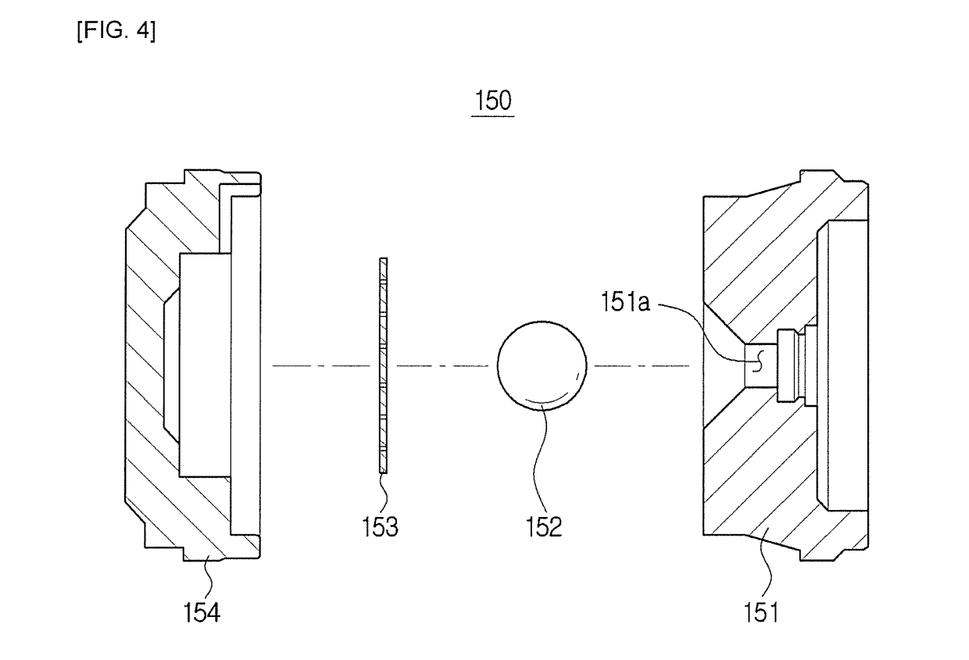
FIG. 4 is an exploded cross-sectional view of an outlet valve according to an embodiment of the present disclosure.
Figure 5:
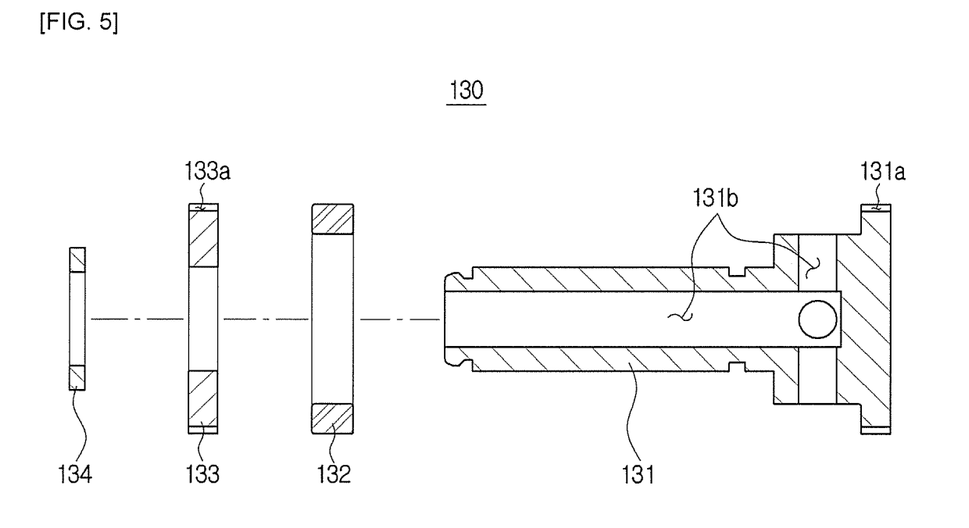
FIG. 5 is an exploded cross-sectional view of a piston unit according to an embodiment of the present disclosure.
Figure 6:
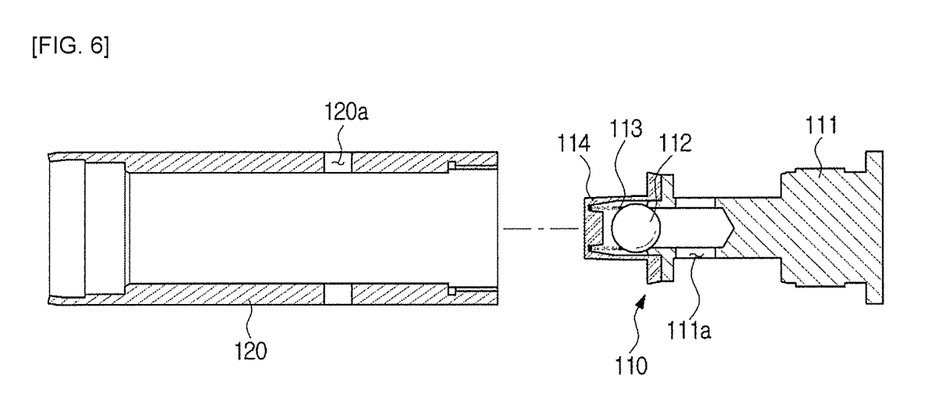
FIG. 6 is an exploded cross-sectional view of a cylinder unit and a first inlet valve according to an embodiment of the present disclosure.

FIG. 2 is a cross-sectional view showing a piston pump for a brake system according to an embodiment of the present disclosure, FIG. 3 is an exploded cross-sectional view of the piston pump for a brake system, FIG. 4 is an exploded cross-sectional view of an outlet valve according to an embodiment of the present disclosure, FIG. 5 is an exploded cross-sectional view of a piston unit according to an embodiment of the present disclosure, and FIG. 6 is an exploded cross-sectional view of a cylinder unit and a first inlet valve according to an embodiment of the present disclosure. Hereinafter, the piston pump 100 for a brake system of the present invention will be described in detail with reference to these drawings.

The piston pump 100 for a brake system according to an embodiment of the present disclosure is installed in a bore 11 of the modulator block 10 that communicates with an inlet port 12 and a discharge port 13, and includes the cylinder unit 120 provided so as to reciprocate within the bore 11, the piston unit 130 having one end fixed and the other end dividing the internal space of the cylinder unit 120 into a first chamber C1 and a second chamber C2 and for expanding or contracting the first chamber C1 and the second chamber C2 by reciprocating movement of the cylinder unit 120, a first inlet valve 110 installed in the cylinder unit 120 for opening and closing an one-way flow of fluid from the inlet port 12 to the first chamber C1, a second inlet valve 140 installed in the cylinder unit 120 for opening and closing an one-way flow of fluid from the inlet port 12 to the second chamber C2, and an outlet valve 150 for opening and closing an one-way flow of fluid from the first chamber C1 or the second chamber C2 to the discharge port 13.

The bore 10 in which the piston pump 100 for a brake system is installed, the inlet port 12 connected to the bore 11 and communicating with the internal space of the cylinder unit 120, and the discharge port 13 connected to the bore 11 and communicating with a discharge passage formed in an outlet cap 154 are formed in the modulator block. The bore 11, which is an open end of the modulator block 10, is closed by the outlet cap 154.

The first inlet valve 110 includes a power transmitting member 111 receiving a forward force or a backward force by the eccentric spindle 20, and a first elastic member 113 which is supported at one end to a retainer 114 fastened to the power transmitting member 111 and which is provided an elastic force to the first opening and closing member 112. The power transmitting member 111 has a first inlet passage 111a, and a seat surface on which a first opening and closing member 112 is seated.

The cylinder unit 120 is provided in a cylindrical shape. A first inflow passage 120a is formed on a surface of the cylinder unit 120 facing the inlet port 12, the first inlet valve 110 having the power transmitting member 111 receiving a forward or backward force by the eccentric spindle 20 is coupled to an opening of one end of the cylinder unit 120, and the second inlet valve 140 is coupled to an opening of the other end of the cylinder unit 120.

A cylinder guide 125 guides an axial movement of the cylinder unit 120. The cylinder guide 125 includes a guide member 129 in contact with the outer surface of the cylinder unit 120, a sealing member 127 for airtight sealing, a back-up piece 128 interposed between the sealing member 127 and the guide member 129, and a stopper 126 for preventing the separation of the sealing member 127.

The piston unit 130 includes a piston 131 provided with a flow passage hole 131b communicating with a discharge chamber C3, a piston seal 132 which moves together with the cylinder unit 120 along the outer surface of the piston 131 to selectively communicate the flow passage hole 131b with one of the first chamber C1 and the second chamber C2, a piston guide 133 guiding the movement of the cylinder unit 120 along the outer surface of the piston 131 and having a second discharge passage 133a, and a stopper 134 for preventing the separation of the piston guide 133. The flow passage hole 131b may be a T-shaped flow passage.

The piston seal 132 may function as a three-way valve connecting one of the first chamber C1 and the second chamber C2 to the flow passage hole 131b. This is possible because the piston seal 132 is moved along the cylinder unit 120 between the piston 131 and the piston guide 133 when the piston pump 100 is operated. When the cylinder unit 120 moves to the left in FIG. 2, the piston seal 132 moves to the left together with the cylinder unit 120 to open a first discharge passage 131a and close the second discharge passage 133a. On the contrary, when the cylinder unit 120 moves to the right in FIG. 2, the piston seal 132 moves to the right together with the cylinder unit 120 to open the second discharge passage 133a and close the first discharge passage 131a.

The second inlet valve 140 includes a second elastic member 141 supported at one end to the cylinder unit 120, a second opening and closing member 142 pressed by the other end of the second elastic member 141, a second guide member 143 guiding the piston unit 130 and provided with a second inlet passage 143a opened and closed by the second opening and closing member 142, and a second stopper member 145 provided with a second inflow passage 145a and preventing the second guide member 143 from being separated. A second sealing member 144 for airtight sealing may be provided between the second guide member 143 and the second stopper member 145.

The outlet valve 150 includes an outlet valve seat 151 to which the piston unit 130 is fixedly installed, the outlet cap 154 coupled to the outlet valve seat 151 to form the discharge chamber C3 communicating with the discharge port 13, an outlet opening and closing member 152 for pressing a flow passage of the outlet valve seat 151 communicating with the flow passage hole 131b of the piston unit 130, and an outlet elastic member 153 supported to the outlet cap 154 and providing an elastic force to the outlet opening and closing member 152.

The outlet valve 150 is provided to open and close an orifice 151a formed in the outlet valve seat 151. That is, when the pressure of the working fluid in the flow passage hole 131b is larger than the elastic force of the outlet elastic member 153 in a state where the opening and closing member 152 is blocking the orifice 151a, the outlet opening and closing member 152 is pushed by the pressure of the working fluid, so that the outlet valve 150 opens the orifice. The outlet elastic member 153 is formed of a leaf spring, so that only the edge portion may be fixedly coupled to the outlet cap 154.

Figure 7:
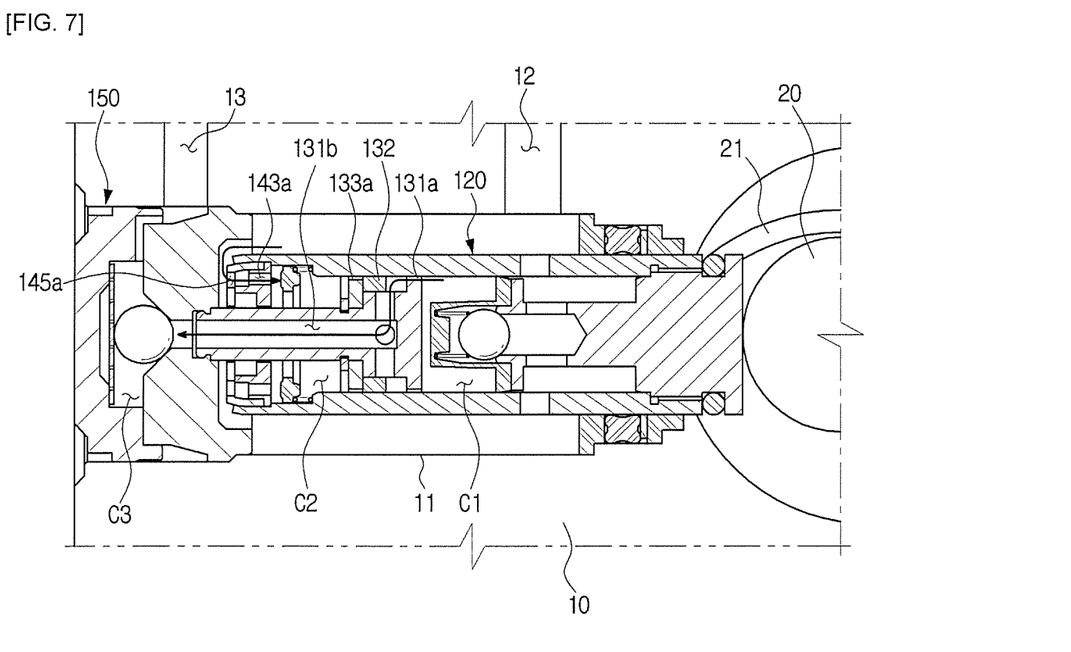
FIG. 7 is a cross-sectional view showing an operating state when a cylinder unit of a piston pump according to an embodiment of the present disclosure is compressed toward an outlet valve.
Figure 8:
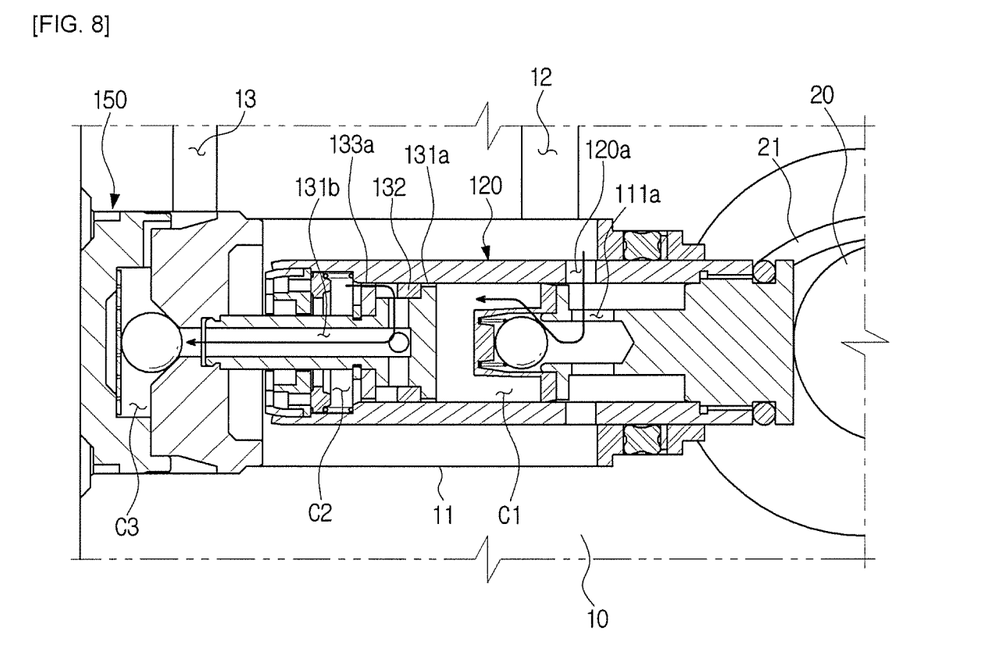
FIG. 8 is a cross-sectional view showing an operating state when a cylinder unit of a piston pump according to an embodiment of the present disclosure is compressed in the direction away from an outlet valve.

FIG. 7 is a cross-sectional view showing an operating state when a cylinder unit of a piston pump according to an embodiment of the present disclosure is compressed toward an outlet valve, and on the contrary, FIG. 8 is a cross-sectional view showing a state in which the cylinder unit of the piston pump is operated when returning to the initial position. Hereinafter, the operation of the piston pump 100 will be described with reference to the drawings.

The piston unit 130 is fixed to the outlet valve 150, and when the motor is rotated, the cylinder unit 120 reciprocates by the ring spring 21. That is, the cylinder unit 120 moves while sliding relative to the piston unit 130.

As shown in FIG. 7, when the cylinder unit 120 is pushed toward the outlet valve 150, the internal space of the first chamber C1 is reduced so that the working fluid in the first chamber C1 is discharged from the first chamber C1, while the inner space of the second chamber C2 is expanded so that the working fluid is sucked into the second chamber C2.

Accordingly, the working fluid stored in the first chamber C1 is discharged to the discharge port 13 through the first discharge passage 131a and the flow passage hole 131b of the piston 131 and the discharge chamber C3 in order, and the working fluid from the inlet port 12 is sucked into the second chamber C2 through the second inflow passage 145a of the second stopper member 145 and the second inlet passage 143a of the second guide member 143.

As shown in FIG. 8, when the cylinder unit 120 is returned to an original position, a flow passage is formed between the second chamber C2 and the third chamber C3 through the second discharge passage 133a as the piston seal 132 moves, and the inner space of the first chamber C1 is expanded so that the working fluid flows into the first chamber C1 while the inner space of the second chamber C2 is reduced so that the working fluid in the second chamber C2 is discharged.

Accordingly, the working fluid stored in the second chamber C2 is discharged to the discharge port 13 through the second discharge passage 133a and the flow passage hole 131b of the piston guide 133 and the discharge chamber C3 in order, and the working fluid from the inlet port 12 is sucked into the first chamber C1 through the first inflow passage 120a of the cylinder unit 120 and the first inlet passage 111a of the power transmitting member 111.

Therefore, the piston pump according to the present disclosure has a reciprocating-discharge and two-piston type pump structure for increasing the pressure in the wheel cylinder while sucking and discharging the working fluid twice during one reciprocating motion, thereby improving the responsiveness and NVH performance of the piston pump.

Further, according to the above structure and operation, the piston pump according to the present disclosure can increase the pressure in the wheel cylinder more quickly by increasing the discharge amount of the working fluid through the speed regulation of the motor and the eccentricity regulation of the eccentric spindle, and can reduce the pressure pulsation in the wheel cylinder generated at the time of discharge of the working fluid.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A piston pump for a brake system installed in a bore of a modulator block communicating with an inlet port and a discharge port, the piston pump comprising:
   a cylinder unit provided to reciprocate within the bore;
   a piston unit having a first end fixed and a second end dividing an inside of the cylinder unit into a first chamber and a second chamber and configured to expand or reduce the internal spaces of the first chamber and the second chamber by reciprocating movement of the cylinder unit;
   a first inlet valve installed in the cylinder unit to open and close a one-way flow of fluid from the inlet port to the first chamber;
   a second inlet valve installed in the cylinder unit to open and close a one-way flow of fluid from the inlet port to the second chamber; and an outlet valve to open and close a one-way flow of fluid from the first chamber or the second chamber to the discharge port, wherein the piston unit includes:
a piston provided with a flow passage hole communicatively connected with a discharge chamber;
a piston seal configured to be movable together with the cylinder unit along an outer circumferential surface of the piston to selectively communicate the flow passage hole with one of the first chamber and the second chamber;
a piston head at the second end of the piston unit and a first discharge passage defined by the piston head and an inner surface of the cylinder unit; and
a piston guide guiding the movement of the cylinder unit along the outer circumferential surface of the piston and having a second discharge passage,
the piston seal is in contact with the outer circumferential surface of the piston, and
the piston seal is configured to be movable between the piston head and the piston guide.

2. The piston pump for a brake system according to claim 1, wherein the piston unit further includes a stopper for preventing the separation of the piston guide.

3. The piston pump for a brake system according to claim 1, wherein a first inflow passage is formed on a surface of the cylinder unit facing the inlet port, the first inlet valve provided with a power transmitting member receiving a forward or backward force by an eccentric spindle is coupled to an opening of one end of the cylinder unit, and the second inlet valve is coupled to an opening of the other end of the cylinder unit.

4. The piston pump for a brake system according to claim 1,
wherein the first inlet valve includes a power transmitting member receiving a forward force or a backward force by an eccentric spindle, and having a first inlet passage and a seat surface on which a first opening and closing member is seated, and a first elastic member supported at one end to a retainer fastened to the power transmitting member to provide an elastic force to the first opening and closing member.

5. The piston pump for a brake system according to claim 1,
wherein the second inlet valve includes a second elastic member supported at one end to the cylinder unit, a second opening and closing member pressed by the other end of the second elastic member, a second guide member guiding the piston unit and provided with a second inlet passage opened and closed by the second opening and closing member, and a second stopper member provided with a second inflow passage and preventing the second guide member from being separated.

6. The piston pump for a brake system according to claim 1,
wherein the outlet valve includes an outlet valve seat to which the piston unit is fixedly installed, an outlet cap coupled to the outlet valve seat to form a discharge chamber communicating with the discharge port, an outlet opening and closing member to press a flow passage of the outlet valve seat communicating with a flow passage hole of the piston unit, and an outlet elastic member supported to the outlet cap and providing an elastic force to the outlet opening and closing member.

7. The piston pump for a brake system according to claim 2,
wherein the stopper is coupled to the outer circumferential surface of the piston.

* * * * *